(12) United States Patent
Haji-Sheikh et al.

(10) Patent No.: US 6,784,659 B2
(45) Date of Patent: Aug. 31, 2004

(54) MAGNETORESISTIVE SPEED AND DIRECTION SENSING METHOD AND APPARATUS

(75) Inventors: Michael J. Haji-Sheikh, Richardson, TX (US); Mark Plagens, Richardson, TX (US); Robert Kryzanowski, Plano, TX (US)

(73) Assignee: Honeywell International Inc., Morristown, NJ (US)

(*) Notice: Subject to any disclaimer, the term of this patent is extended or adjusted under 35 U.S.C. 154(b) by 110 days.

(21) Appl. No.: 10/011,543

(22) Filed: Dec. 5, 2001

(65) Prior Publication Data

US 2003/0102860 A1 Jun. 5, 2003

(51) Int. Cl.[7] ............................. G01P 3/54; G01R 33/09
(52) U.S. Cl. ............. 324/174; 324/207.21; 324/207.25
(58) Field of Search .......................... 324/174, 207.21, 324/207.24, 207.25, 207.26, 232, 173; 338/32 R

(56) References Cited

U.S. PATENT DOCUMENTS

| | | | |
|---|---|---|---|
| 4,053,829 A | * | 10/1977 | Maruo .................... 324/260 |
| 4,401,944 A | | 8/1983 | Narimatsu et al. |
| 4,533,872 A | | 8/1985 | Boord et al. |
| 5,304,926 A | | 4/1994 | Wu |
| 5,469,054 A | | 11/1995 | Bicking |
| 5,574,364 A | | 11/1996 | Kajimoto et al. |
| 5,596,272 A | | 1/1997 | Busch |
| 5,644,225 A | | 7/1997 | Alfors et al. |
| 5,670,875 A | | 9/1997 | Alfors et al. |
| 5,694,039 A | | 12/1997 | Alfors |
| 5,694,040 A | | 12/1997 | Plagens |
| 5,982,178 A | | 11/1999 | Pant et al. |
| 6,559,638 B1 | | 5/2003 | Adelerhof |
| 6,577,121 B1 | | 6/2003 | Adelerhof et al. |

FOREIGN PATENT DOCUMENTS

| | | |
|---|---|---|
| DE | 19701927 | 6/1998 |
| EP | 1030181 A2 | 7/2002 |

OTHER PUBLICATIONS

Dipl.–ing Gerhard Hager, Magnetoresistive Sensoren messen Drehwinkel, Electronick, vol. 42, No. 12, Jun. 15, 1993, pp. 30–34.

* cited by examiner

*Primary Examiner*—N. Le
*Assistant Examiner*—Reena Aurora
(74) *Attorney, Agent, or Firm*—Kris T. Fredrick; Kermit D. Lopez; Luis Ortiz

(57) ABSTRACT

The ring magnet speed and direction sensing scheme according to the present invention addresses many of the shortcomings of the prior art. In accordance with various aspects of the present invention, a pair of bridges placed on the same semiconductor chip are provided for sensing the passing of north/south transition points on a ring magnet. In accordance with an exemplary embodiment, the bridge contains a first group of runners that are perpendicular to a second group of runners. The bridges are placed to cause the signal from one bridge to slightly follow the signal from the other bridge. Placement of the bridges on the same chip enables highly accurate readings.

34 Claims, 11 Drawing Sheets

MAGNETORESISTIVE SPEED AND DIRECTION SENSING METHOD AND APPARATUS

FIELD OF THE INVENTION

The present invention relates to a method for sensing and a magnetic sensor for moving objects. More particularly, the present invention relates to a sensor for determining speed and direction of moving or rotating targets, such as, for example, gears, shafts, joints, wheels, fans, turbines, tires, conveyors or like moveable objects.

BACKGROUND OF THE INVENTION

The demand for higher performance vehicles and for lightweight devices providing accurate speed and direction of rotation measurements for shafts, wheels, and gears continues to increase rapidly. As a result, improvements in electronics-based products for use in sensing applications are needed. For example, in the automotive industry, it is desirable to use sensors to accurately measure the speed and direction of rotation of wheels, transmissions, shafts, gears and other rotatable objects. This measurement information can be processed by on board computers in communication with the sensors to improve the fuel efficiency and power in automatic transmissions, to monitor the performance of the transmission or to control the automobile's braking systems (e.g. an Anti-lock Braking System). For example, in an automobile equipped with anti-lock brakes, a computer in communication with the automobile braking sensors may receive information relating to the tire's rotational velocity and rotational direction, process such information and thereafter control the automobile's brakes to lessen the severity of any perceived skid or braking malfunction.

A large number of speed and direction sensing devices exist. Such devices are discussed, for example, in U.S. Pat. Nos. 5,880,585, 5,523,679, 5,264,789 and 4,789,826. Furthermore, ring magnets or linear magnets are well known in the sensing arts. A conventional ring magnet 110 is illustrated in FIGS. 1A and 1B, while a conventional linear magnet 109 is illustrated in FIGS. 1C and 1D. Ring magnet 110 is typically formed in a circular pattern, having a plurality of alternating north and south pole permanent magnet segments. This 'chain' of magnets forms a circle or ring of magnets which, for example, can be placed or disposed circumferentially around an object. Similarly, linear magnet 109 is typically formed in an approximately linear pattern, having a plurality of alternating north and south pole permanent magnet segments. For purposes of this discussion, the north polarity of each magnet is referred to in the drawings as item 113 while the south polarity is referred to in the drawings as item 112.

As seen in FIGS. 1A through 1D, a plurality of flux lines 102 are illustrated which represent an exemplary magnetic field generated by each magnet. As is known in the art, a magnetic field (represented by magnetic flux lines) exists such that the magnetic field flows from the north polarity to the south polarity regardless of the coordinate dimension used. For example, the flux lines illustrated in FIGS. 1A and 1B may depict a magnetic field which is external to the ring magnet 110, internal to the ring magnet 110, or may depict a magnetic field in any orientation (e.g., three dimensional) flowing from the magnet's north polarity to the magnet's south polarity. Similarly, the flux lines exemplified in FIGS. 1C and 1D may depict a magnetic field adjacent to the linear magnet 110 or may depict a magnetic field in any orientation (e.g., three dimensional) flowing from the magnet's north polarity to the magnet's south polarity. In each case, the flux lines flow away perpendicular (e.g., 103) from the magnet's north polarity (e.g., 113) and magnetically curve or bend towards the magnet's south polarity (e.g., 112) where they flow back perpendicular (e.g., 105) to the magnet's south polarity. The area where the flux lines magnetically curve or bend can be represented by a portion of the flux line (e.g., 104) which is approximately horizontal or parallel to the magnet's surface in any given coordinate location. Thus, for example, as seen in FIG. 1B, flux line 106 may represent a portion of a magnetic field which can be generated between any north polarity of a magnet and a south polarity of a magnet in any coordinate axis.

A Wheatstone bridge, such as the representative circuit illustrated in FIG. 2, may be helpful in determining resistance of a variable resistor, and thus, it may be useful as a sensing means in some applications. A typical Wheatstone bridge includes resistive elements $R_A$ (231), $R_B$ (232), $R_C$ (233) and $R_D$ (234), all in electrical communication with voltage source 210 and ground 240. A differential voltage $V_B$ may be measured to obtain a voltage signal that changes with changes in the resistance of each of the four resistive elements $R_A$ (231), $R_B$ (232), $R_C$ (233) and $R_D$ (234). A Wheatstone bridge such as the one illustrated in FIG. 2 has the advantage of being able to self-compensate for temperature variations in the range of, for example, −40° to 200° Centigrade. Thus, for example, a Wheatstone bridge could be used in thermocouple applications.

When a sensor is placed within a magnetic field, the sensor's resistors may be influenced by the magnetic field. As illustrated in FIG. 3A, a magnetic field (e.g., flux lines 102) which runs substantially parallel to a resistive device 301 tends to have little or no electrical effect on the resistive device. In contrast, as illustrated in FIG. 3B, a magnetic field 102 which runs perpendicular to the resistive device 301 appears to electrically influence the resistive device and appears to change the resistivity of the device.

Prior art magnetic sensing devices suffer from many disadvantages. For example, prior art magnetic sensing devices (such as silicon Hall integrated sensors) have a limitation of around 20 gauss minimum signal due to inherent stress-induced offsets. This reduces the range of available signal which in turn reduces the available mechanical tolerance. Using two independent sensors would produce placement errors which may be very difficult to tolerate in a manufacturing environment.

SUMMARY OF THE INVENTION

The following summary of the invention is provided to facilitate an understanding of some of the innovative features unique to the present invention and is not intended to be a full description. A full appreciation of the various aspects of the invention can only be gained by taking the entire specification, claims, drawings, and abstract as a whole.

The method and device according to the present invention addresses many of the shortcomings of the prior art and further provides the advantage of, among other items, generating the rotational velocity and rotational direction of a rotating object. In accordance with one exemplary embodiment of the present invention, at least two bridges are provided, each having resistors. The resistors are configured to be electrically influenced by a magnetic field from an adjacent array of magnetic elements. In another embodiment, the bridges are in electrical communication with a computing means, such as a microprocessor or a microcontroller. Thus, for example, each bridge may comprise a Wheatstone bridge in communication with a microprocessor. In another embodiment, at least two bridges in communication with a computing means may be provided adjacent to a magnetic array, each bridge having resistors which are electrically influenced by a magnetic field. In another embodiment, the present invention includes at least two bridges with each bridge having a first set of resistors and a second set of resistors configured in a bridge, the first set of resistors being oriented approximately perpendicular to the second set of resistors. In another embodiment, the present invention includes at least two bridges fabricated as an integrated circuit, the bridges each comprising resistors which are electrically influenced by a magnetic field. In another embodiment, the present invention comprises at least two bridges, fabricated as an integrated circuit, with each bridge configured to be in communication with a computing means and each bridge having resistors which are electrically influenced by a magnetic field.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures further illustrate the present invention and, together with the detailed description of the invention, serve to explain the principles of the present invention.

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components, e.g., buffers, sensors, bridges, voltage and current references, memory components and the like, comprised of various electrical devices, e.g., resistors, transistors, capacitors, diodes or other devices, whose values may be suitably configured for various intended purposes. Furthermore, these electrical devices may be in a semiconductor or like integrated circuit form. In addition, the present invention may be practiced in any magnet/sensor-based application. Such general applications that may be appreciated by those skilled in the art in light of the present disclosure are not described in detail herein. Further, it should be noted that while various components may be suitably coupled or connected to other components within exemplary circuits, such connections and couplings can be realized by direct connection between components, or by connection through other components and devices located there between.

In one exemplary embodiment of the present invention, the speed and direction of a moving member is determined by decoding the signal from each of at least two bridges separated by a distance and influenced by a variable magnetic field moving relative to the sensor. For example, in one exemplary embodiment, because of the phase difference between the two bridge output signals, the direction of movement may be determined by identifying the leading and lagging bridges. In another exemplary embodiment, the sensor comprises anisotropic magneto resistive (AMR) devices or, alternatively, giant magneto resistive (GMR) devices.

Figure 1A:
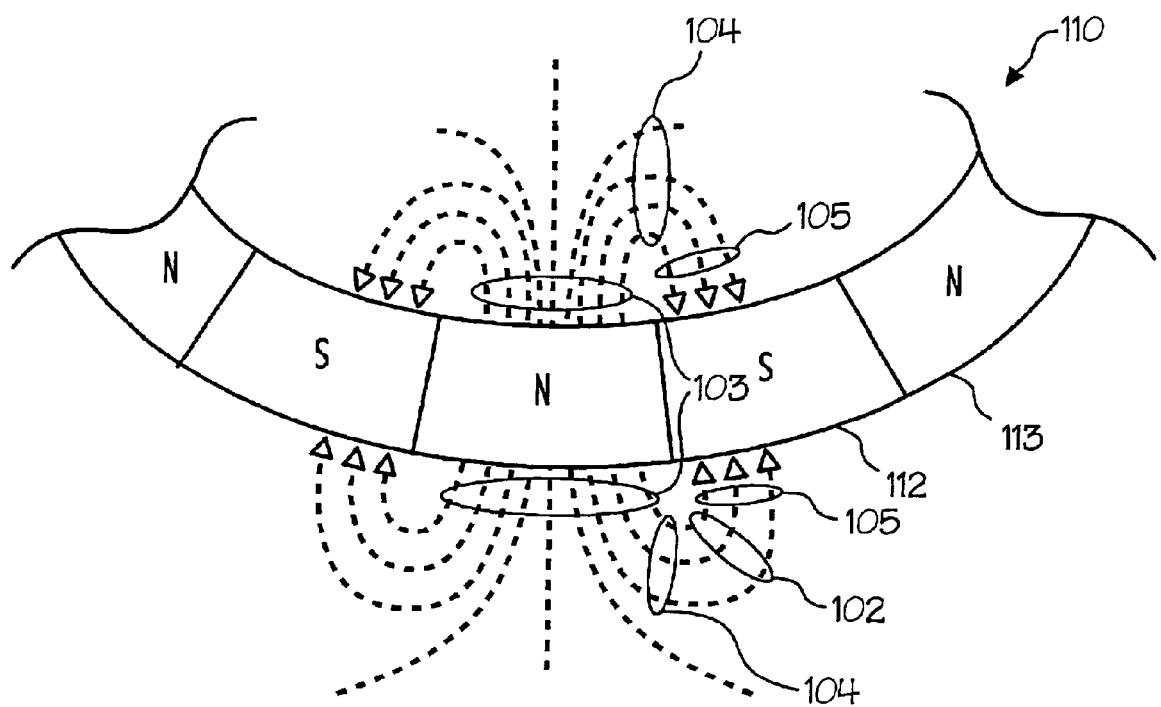
FIGS. 1A–1B depict a prior art ring magnet exhibiting a magnetic field illustrated by a plurality of flux lines.
Figure 1C:
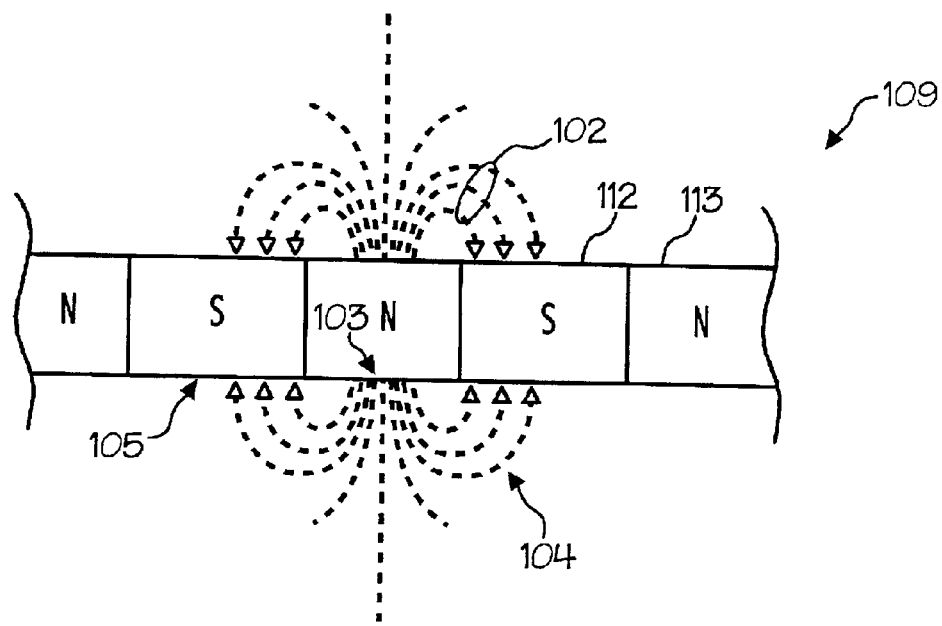
FIGS. 1C–1D depict a prior art linear magnet exhibiting a magnetic field illustrated by a plurality of flux lines.
Figure 1B:
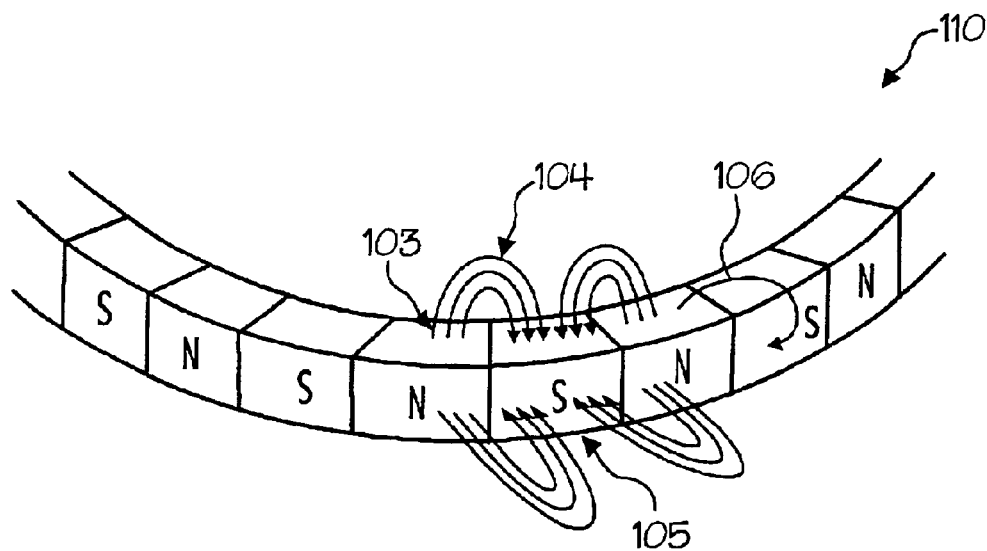
Figure 1D:
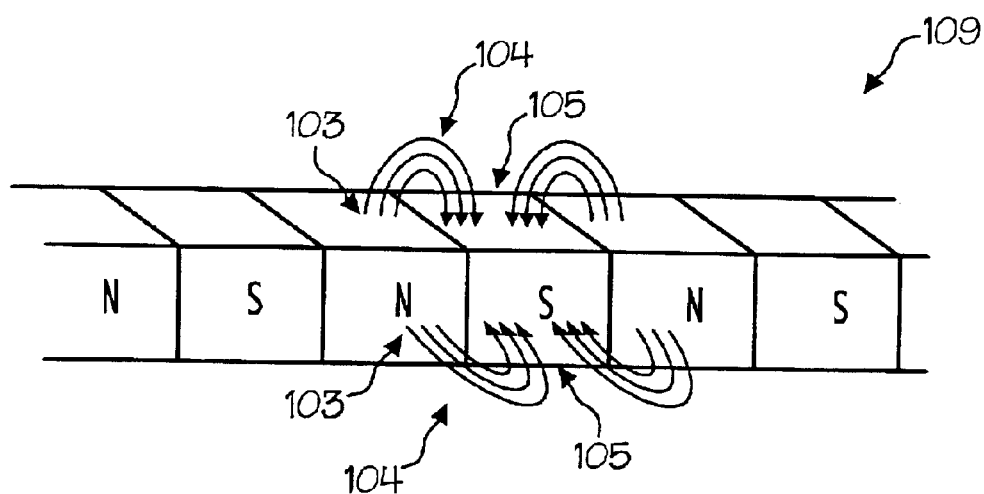
Figure 2:
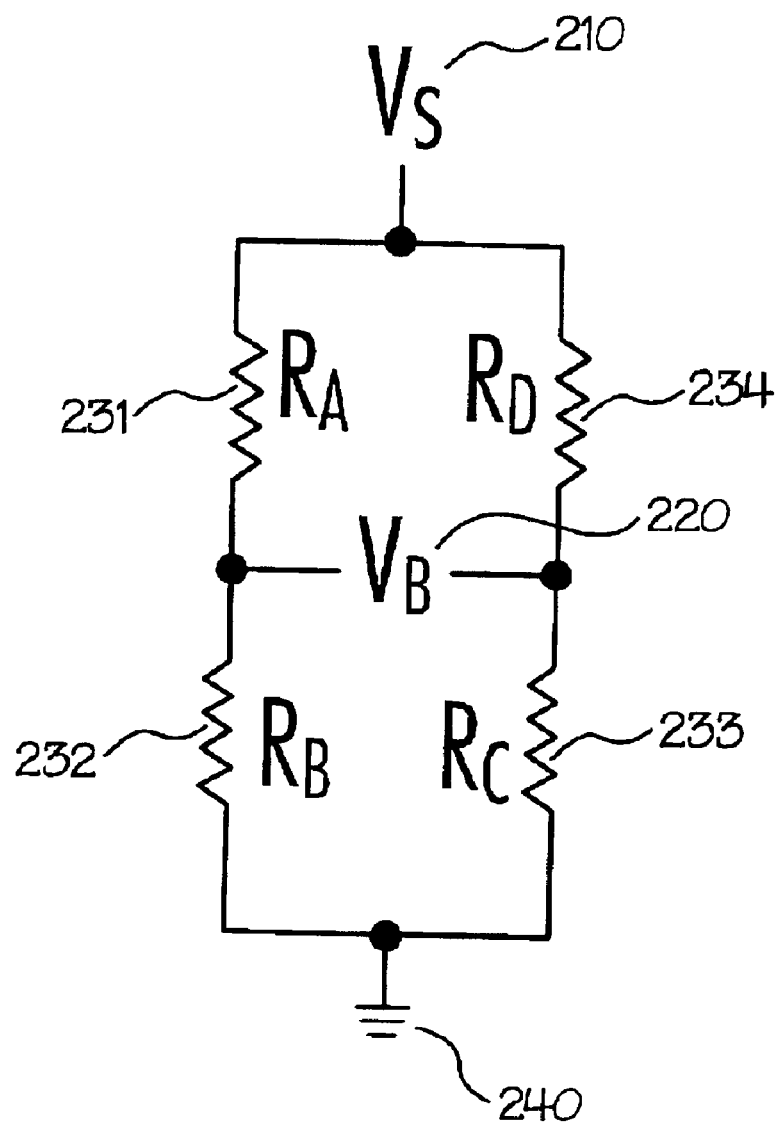
FIG. 2 illustrates a prior art circuit diagram of an exemplary Wheatstone bridge.
Figure 3A:
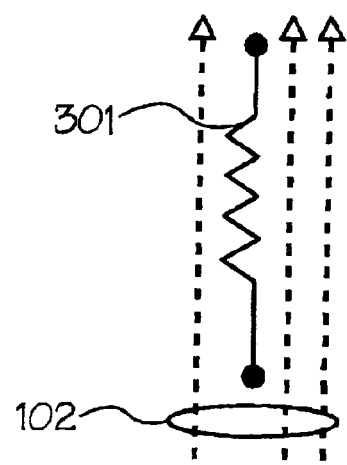
FIGS. 3A–3B depict a resistive device in the presence of various magnetic field orientations.
Figure 3B:
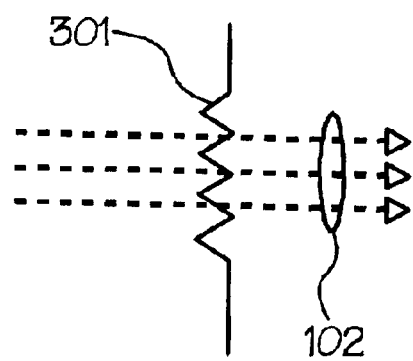
Figure 4:
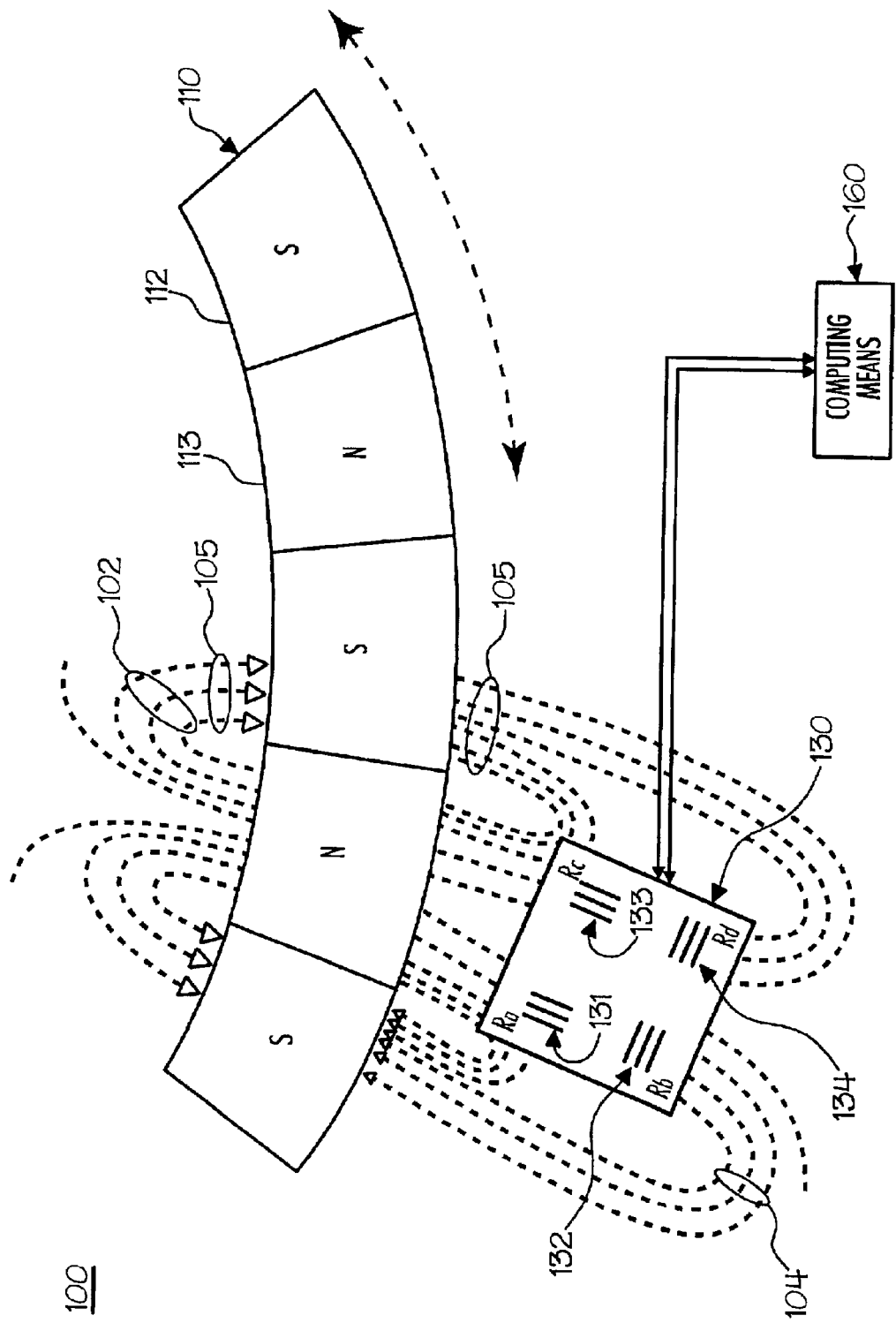
FIG. 4 illustrates an exemplary bridge in accordance with one aspect of the present invention.

The operation of one of the two bridges is understood with reference to an exemplary embodiment shown in FIG. 4. A bridge 130 is provided having a plurality of resistive devices, elements or runners 131, 132, 133 and 134 which may be configured to be electrically influenced by an adjacent magnetic field. In one embodiment, runners 131 and 133 may be disposed within bridge 130 perpendicular to runners 132 and 134 such that runners 131 and 133 may be electrically influenced by the portion of the magnetic field being perpendicular to runners 131 and 133 and such that runners 132 and 134 may be electrically influenced by the portion of the magnetic field being perpendicular to runners 132 and 134. For example, an exemplary bridge may be configured to include a plurality of resistive elements or runners electrically connected in a bridge formation (such as, for example, a Wheatstone bridge) so that a first set of runners $R_a$ and $R_c$ may be oriented approximately perpendicular to the second set of runners $R_b$ and $R_d$.

As seen in FIG. 4, a representative bridge 130 communicates in one embodiment with a computing means 160 and may be disposed adjacent to a magnet array such as ring magnet 110. In this embodiment, ring magnet 110 rotates in an unknown direction and at an unknown speed. As the ring magnet 110 rotates, the alternating north and south poles of each of the individual north-south magnets (e.g., 113, 112) may pass by and electrically influence the first set of runners $R_a$ and $R_c$ and/or the second set of runners $R_b$ and $R_d$ within the bridge 130. As discussed previously, if the magnetic field is oriented parallel to the resistive element or runner, it may not electrically influence each runner; however, if the magnetic field is oriented perpendicular to the resistive element or runner, it may electrically influence the runner. Thus, in this embodiment, when the magnetic field is oriented parallel to the first set of runners $R_a$ and $R_c$, the field may not electrically influence these runners. However, the magnetic field may electrically influence these runners if the field is oriented perpendicular to these runners. Similarly, in this embodiment, when the magnetic field is oriented parallel to the second set of runners $R_b$ and $R_d$, the field may not electrically influence these runners. However, the magnetic field may electrically influence these runners if the field is oriented perpendicular to these runners.

Figure 5:
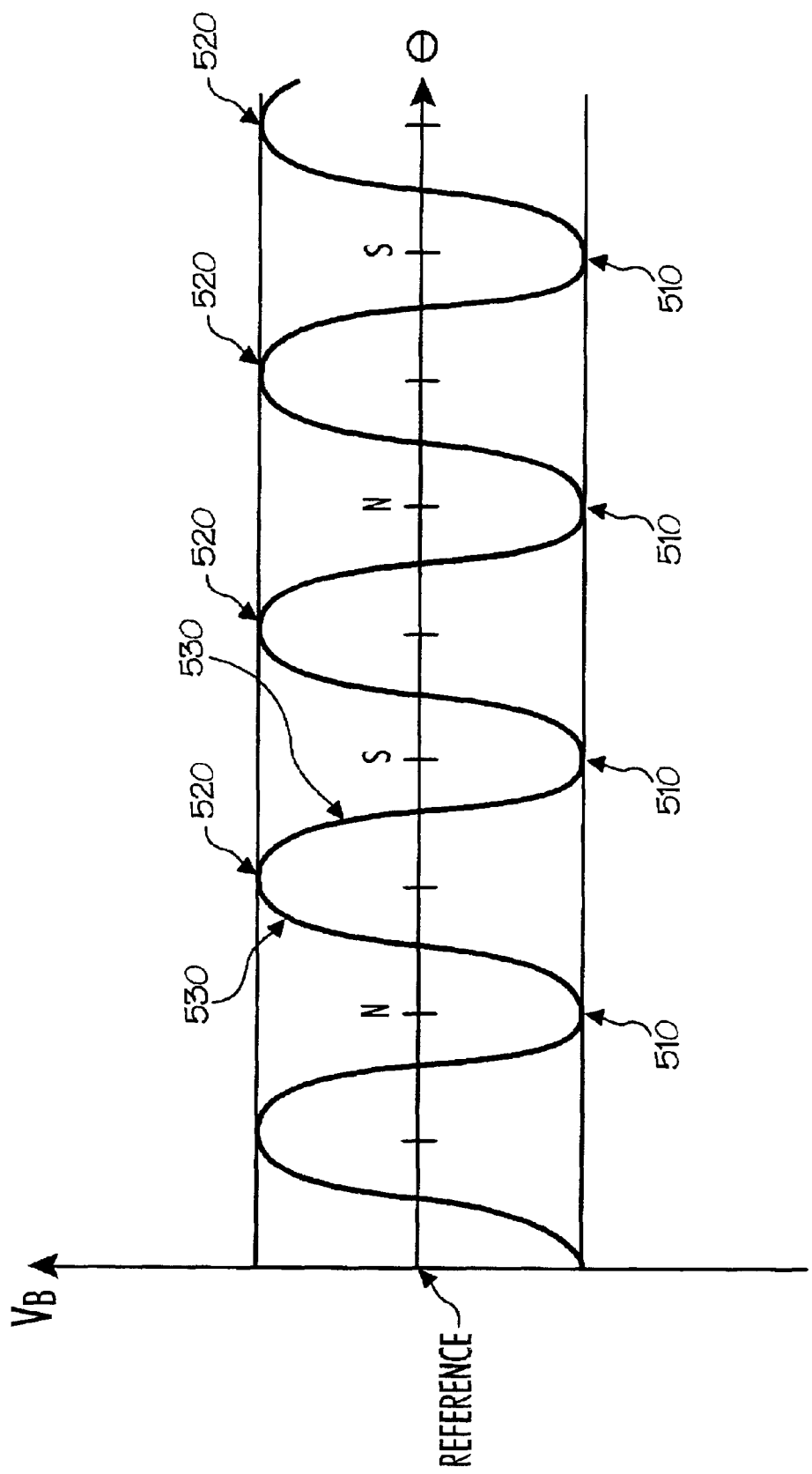
FIG. 5 illustrates a signal diagram representative of an exemplary Wheatstone bridge differential voltage measurement in accordance with one aspect of the present invention.

In another aspect of the present invention, as illustrated in FIG. 5, a differential voltage signal $V_b$ may be generated by bridge 130 and transmitted to computing means 160. In this aspect, the voltage signal $V_b$ received by computing means 160 represents when the bridge 130 is in direct facing relationship 510 with a pole (e.g., north or south) on an individual magnet, when the bridge 130 is in a direct transitional relationship 520 between poles (e.g., a north pole to a south pole transition or a south pole to north pole transition) or when bridge 130 is in an indirect transitional relationship 530 between poles (e.g., somewhere between a direct facing relationship 510 and a direct transitional relationship 520). Thus, for example, when bridge 130 is in direct facing relationship with a pole as shown FIG. 4, the magnetic field may not influence runners $R_a$ and $R_c$, which are substantially parallel to the magnetic field. However, the magnetic field may electrically influence runners $R_b$ and $R_d$, which are substantially perpendicular to the magnetic field. The influence of the magnetic field on all four runners may be sensed by bridge 130, creating differential voltage signal $V_b$ 510 as shown in FIG. 5 and processed by the computing means 160.

Similarly, when bridge 130 is in direct transitional relationship between poles, runners $R_a$ and $R_c$ may be electrically influenced by a magnetic field perpendicular to those runners while runner $R_b$ and $R_d$ are not electrically influenced by the magnetic field, thus creating voltage signal 520 as shown in FIG. 5. When bridge 130 is in indirect transitional relationship between poles, runners $R_a$ and $R_c$ and runners $R_b$ and $R_d$ may partially be influenced by the magnetic field or may not be influenced by the magnetic field, creating voltage signal 530 as shown in FIG. 5.

Figure 6:
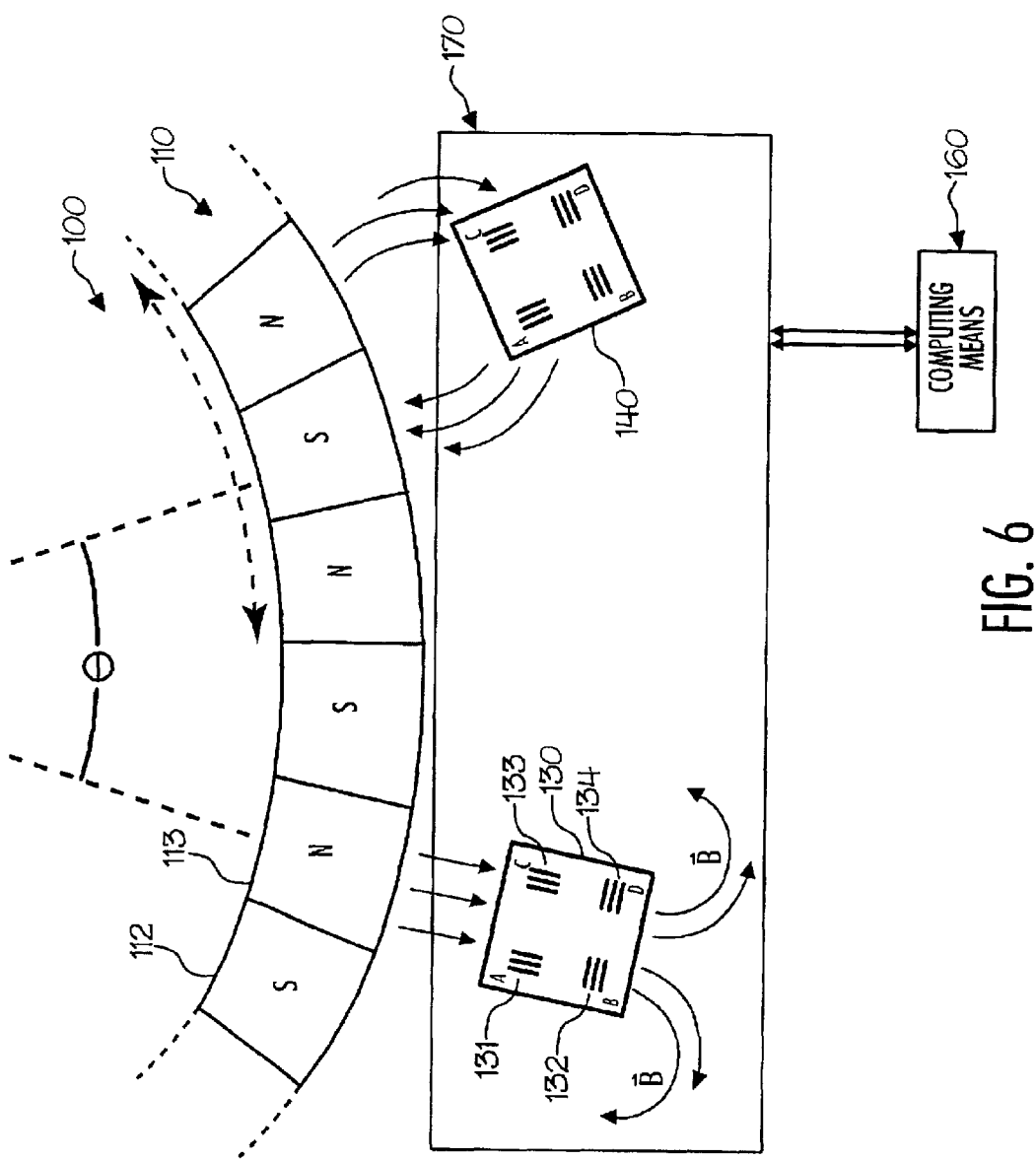
FIG. 6 illustrates an exemplary pair of bridges in accordance with another aspect of the present invention.
Figure 7:
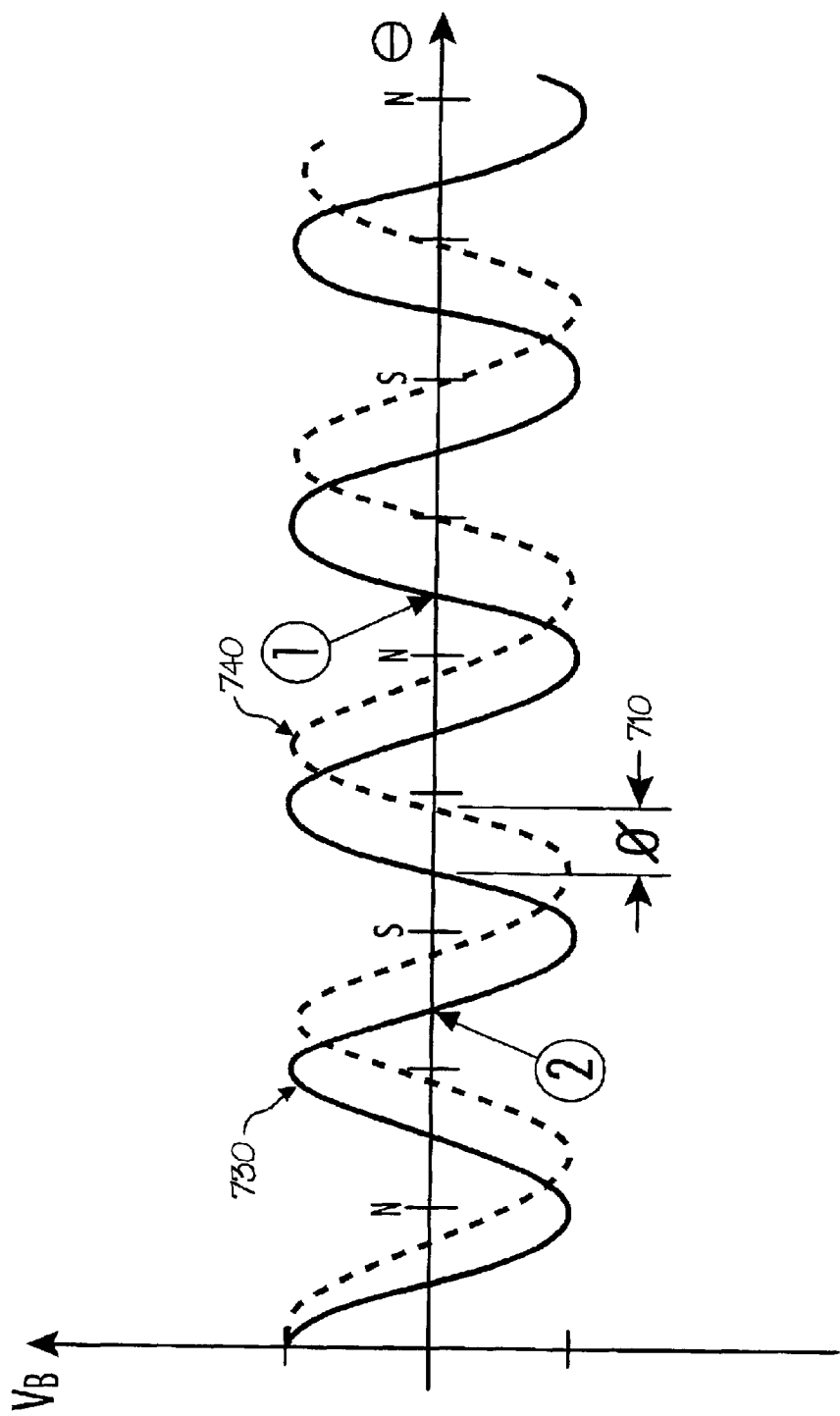
FIG. 7 illustrates a signal diagram representative of exemplary Wheatstone bridge differential voltage measurements in accordance with another aspect of the present invention.

In accordance with an exemplary embodiment of the present invention at least two bridges are employed to determine the rotational direction of the target. FIG. 6 shows an exemplary embodiment of the present invention with a second bridge 140. The second bridge 140 includes runners and orientations similar to the first bridge and may similarly communicate with computing means 160. Second bridge 140 is, in one embodiment, disposed a predetermined distance away from first bridge 130 so that the $V_b$ signal from second bridge 140 is phase shifted from the $V_b$ signal from first bridge 130. In this embodiment, and with reference to FIG. 7, computing means 160 processes the first 730 and second 740 $V_b$ signals and determines the direction of rotation of the target (not shown) based on the phase shift 710 between the two signals and depending on which signal is leading the other. The signals may be processed using logic devices, such as exclusive OR devices, or through other integrated circuit processing devices or programs.

Figure 8:
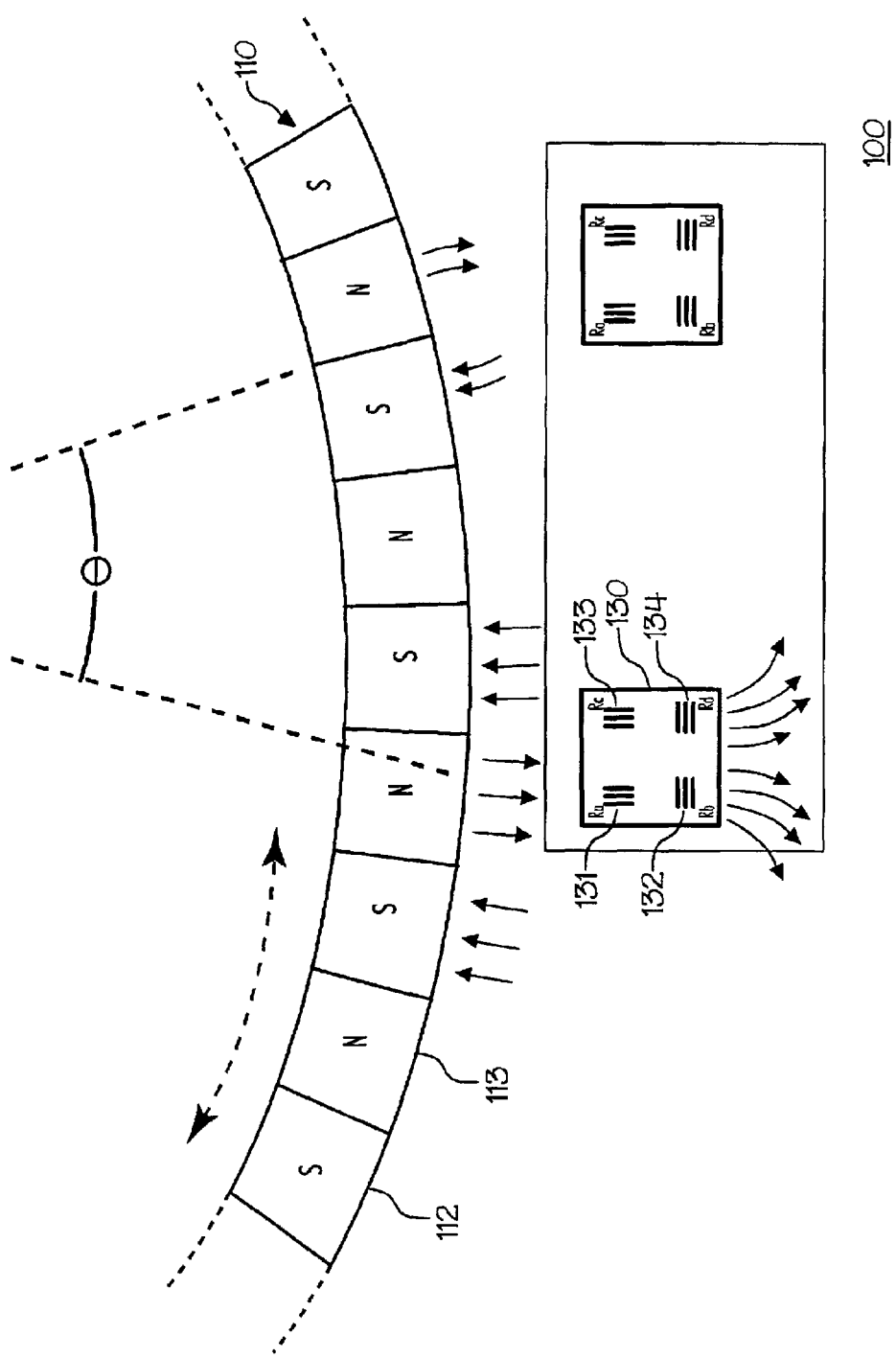
FIG. 8 illustrates an exemplary pair of bridges in accordance with another aspect of the present invention.
Figure 9:
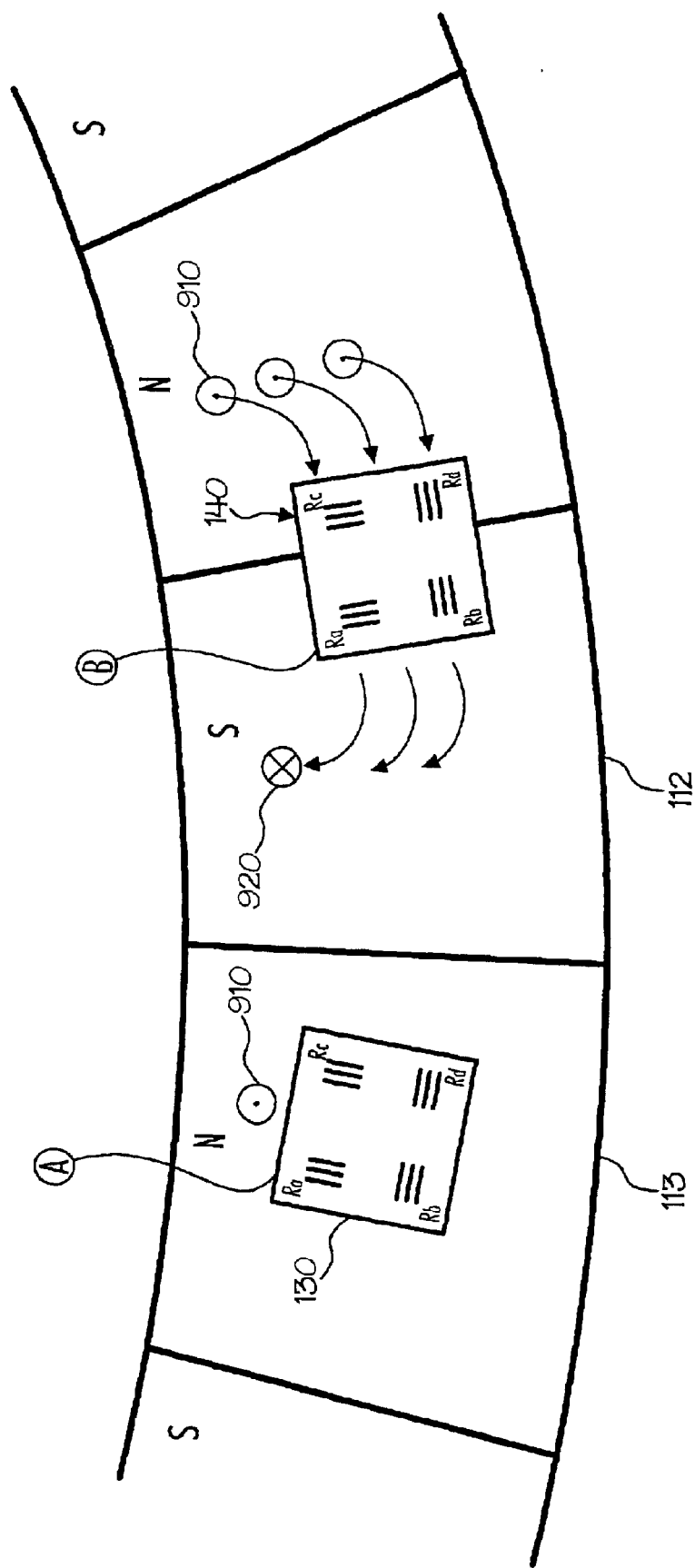
FIG. 9 illustrates an exemplary pair of bridges in accordance with another aspect of the present invention.

With further reference to FIG. 6, attention is turned to the orientation of the bridges with respect to the ring magnets. Bridges 130 and 140 may, in one embodiment, be oriented with a first group of runners in each bridge oriented parallel to a radial line from the center of the ring magnet and a second group of runners in each bridge oriented perpendicular to the radial line from the center of the ring magnet. In this manner, the bridges 130, 140 may be angled with respect to each other to account for the curvature of or specific design of the ring magnet 110. In another exemplary embodiment, illustrated for example in FIG. 8, bridges 130 and 140 may be oriented identically, ignoring the effect of the ring magnet curvature. It may be advantageous to ignore the curvature in a ring magnet due to efficiencies in constructing a single sensor that may be suitable for ring magnets of any diameter, size or shape. This orientation may also facilitate construction of the present invention in either a semiconductor embodiment or in a device made of electronic components. It should be understood, however, that bridges 130 and 140 can be angled with respect to the radial line from the center of the ring magnet, that the resistive elements can be angled with respect to the radial line from the center of the ring magnet, or any combination thereof In yet another embodiment, the present invention may comprise two or more bridges in communication with a top or bottom side (as opposed to the end) of the ring magnet. In an exemplary embodiment, shown in FIG. 9, two bridges are shown adjacent to the side of ring magnet 110. In this embodiment, the bridge may be oriented in a plane approximately parallel to the surface of the plane of the side face (e.g., top or bottom) of the ring magnet 110. In this exemplary embodiment, the magnetic field exits the north pole 113 perpendicular to the side surface of the ring magnet 110, for example, at 910, and enters the south pole 112 perpendicular to the side surface of the ring magnet, for example, at 920. In this embodiment, when bridge 130 is in direct facing relationship with a pole as shown in FIG. 9 at position "A", the magnetic field may equally influence runners $R_a$, $R_b$, $R_c$, and $R_d$, which are perpendicular to the magnetic field (i.e., in a direction pointing out of the page). However, when bridge 140 is in direct transitional relationship between poles as shown at position "B", runners $R_a$ and $R_c$ may be electrically influenced by a magnetic field that is parallel to the plane in which the runners lie and perpendicular to runners $R_a$ and $R_c$ while runner $R_b$ and $R_d$ may not be electrically influenced by the magnetic field that flows parallel to those runners.

Figure 10:
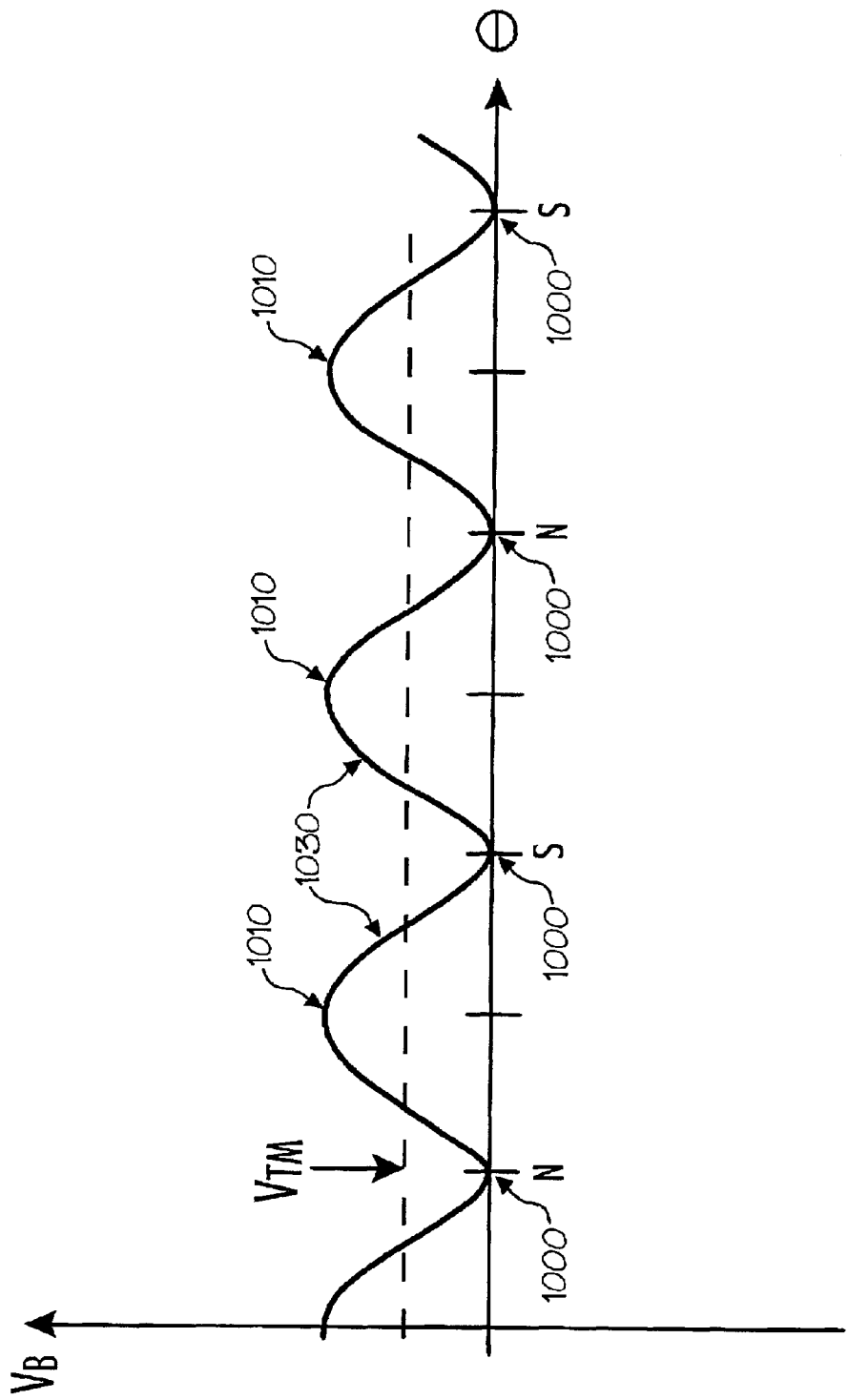
FIG. 10 illustrates a signal diagram representative of an exemplary Wheatstone bridge differential voltage measurement in accordance with another aspect of the present invention.

In one exemplary embodiment, a sensor oriented as shown in FIG. 9 produces a signal $V_b$ from, for example, first bridge 130 as shown in FIG. 10. With further reference to FIG. 10, such a signal may, for example, depict zero volts (e.g., reference point 1000) when all four runners are equally influenced, as bridge 130 is in direct facing relationship with a pole. The $V_b$ signal may also show a maximum voltage level (e.g., reference point 1010) when bridge 140 is in direct transitional relationship between poles. Furthermore, when bridge 130 is in indirect transitional relationship between poles, runners $R_a$ and $R_c$ and runners $R_b$ and $R_d$ may partially be influenced by the magnetic field or may not be influenced by the magnetic field creating voltage signal (e.g., reference point 1030 as shown in FIG. 10).

Exemplary embodiments of the present invention can be designed or modified to encompass various applications or uses. For example, certain applications may require various sized, shaped or oriented magnets. Also, certain applications may use north and south pole segments that are the same size, while other applications may use magnetic segments that vary in size. Or, certain applications may comprise sensors located outside the ring magnet, inside the ring magnet, oriented toward the surface of the side of the ring magnet, or in any other position adjacent to the ring magnet. Furthermore, the magnets may be used in a linear array for sensing the speed and direction of linear moving objects such as hydraulic equipment, conveyor belts, and other linearly moving machinery.

The present invention may be used in various embodiments. For example, in one embodiment, the sensors may be placed approximately 3 mm to 20 mm from ring magnet 110. In another embodiment, first bridge 130 may be located a distance from second bridge 140 such that their respective $V_b$ signals are 1.5° out of phase from each other, for example, 1.4–1.5 mm apart. The spacing between the two bridges may also be dependent on factors such as size of the shaft, sensitivity of the bridges, and diameter of the ring magnet.

Several advantages exist in exemplary aspects of the present invention. In an exemplary embodiment, the two bridges are formed or fabricated on a single integrated circuit, thereby improving sensor sensitivity and accuracy, reducing the size of the sensor, reducing the manufacturing costs, increasing the efficiency of producing the sensor, and simplifying the manufacturing process. In an all-semiconductor environment, tighter manufacturing tolerances can be achieved (on the order of a few microns) compared to tolerances that can be reasonably achieved if the bridges are separately placed (on the order of 2–10 thousandths of an inch). FIG. 6 illustrates an exemplary semiconductor 170 containing both bridges. Furthermore, computing means 160 may also be included on the same semiconductor 170. For further background on combining a sensor in bipolar circuitry, see U.S. Pat. No. 5,667,879, owned by the applicant, the general functionality of which is incorporated by reference.

In various embodiments, the number of runners, number of Wheatstone resistance elements, number of sets of resistive elements, and the orientation of the runners may vary. The sensitivity of the bridge may depend on many factors, such as: orientation of the runners, position of the bridges, resistance of the runners, size of the runners, number of runners, current desired in the circuit, voltage desired, thickness of the film and composition of the magnetic sensing film. Each resistor $R_a$, $R_b$, $R_c$, and $R_d$ may represent an individual component or multiple components combined to achieve the desired specifications. For example, resistor $R_a$, may comprise resistors in parallel, or resistors in series, or a combination of resistors in parallel and series. Although described as resistors, these components may be other components or may be semiconductor versions of these resistors or components.

With respect to the location of the runners $R_a$, $R_b$, $R_c$, and $R_d$, even while maintaining the orientation of these runners, it is possible to change the placement of the runner sets on the bridge. For example, $R_a$ could be swapped with $R_d$, or $R_a$ and $R_c$ could be swapped with $R_b$ and $R_d$. Any layout of the sets of runners may also be acceptable. Furthermore, while in one exemplary embodiment of the present invention sets A and C are perpendicular to sets B and D, in other embodiments the two groups of runners could be oriented in various directions relative to the ring magnet. For example, all the sets of runners may be oriented parallel to each other in a differential bridge which uses the spatial placement of the runners to generate the signals that are used to determine the speed and direction of the rotating object.

Although the present invention has been described in terms of a dual bridge sensor for sensing the speed and direction of a moving object, in another aspect of the invention, a single bridge speed sensor is also disclosed. Additionally, any number of sensors can be employed. With reference to FIG. 4, a sensor comprising a single bridge 130 provides signals to a computing means 160 representative of the passing of discrete magnetic segments or transitions between those segments. Therefore, using standard calculation techniques, the speed of rotation can be determined using similar methods and structures as disclosed herein for speed and direction sensors.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as varying or alternating the steps in different orders, and changing the physical placement and orientation of the sensors and bridges and runners to achieve the same results. These alternatives can be suitably selected depending upon the particular application or in consideration of any number of factors associated with the operation of the system. In addition, the techniques described herein may be extended or modified for use with other types of devices, in addition to a ring magnet sensor device. For example, the invention may be implemented in linear speed sensing devices such as conveyor belts, robotics, automotive steering, suspension or other devices. These and other changes or modifications are intended to be included within the scope of the present invention.

The embodiments of an invention in which an exclusive property or right is claimed are defined as follows:

1. A method for implementing a ring-type magnetoresistive sensor, the method comprising the steps of:

generating a variable magnetic field by a ring magnet; and introducing a first bridge and a second ridge, each adjacent to the ring magnet, the first bridge and second bridge each comprising a first set of runners and a second set of runners, wherein the first set of runners is approximately perpendicular to the second set of runners, the first set of runners and the second set of runners being electrically influenced by the magnetic field and each bridge generating at least a direct facing relationship signal and a direct transitional relationship signal as the ring magnet moves; the second bridge being located a distance from the first bridge such that a phase difference exists between the signals of th two bridges;

wherein the first and second bridges are oriented with respect to the ring magnet such that the first set of runners is substantially in parallel to a radial line from the center of the ring magnet and the second set of runners is substantially perpendicular to the radial line from the center of the ring magnet.

2. The method of claim 1, the ring magnet further comprising at least a first magnetic orientation and at least a second magnetic orientation.

3. The method of claim 1, wherein the first bridge and the second bridge are substantially aligned in the moving direction of the ring magnet.

4. The method of claim 1, the first set of runners further comprising a first set of resistive elements, the second set of runners further comprising a second set of resistive elements.

5. The method of claim 1, the first set of runners and the second set of runners further generating at least an indirect transitional relationship signal.

6. The method of claim 1, further comprising the step of introducing a computing means in communication with at least one of the first bridge and second bridge.

7. The method of claim 6, the computing means determining the speed of the ring magnet.

8. The method of claim 6, the ring magnet moving rotationally.

9. The method of claim 8, the computing means determining the rotational direction of the ring magnet based upon the first bridge signal's relationship to the second bridge signal.

10. The method of claim 1, the ring magnet moving linearly.

11. The method of claim 1, the first bridge being a Wheatstone bridge, the second bridge being a Wheatstone bridge.

12. A method of forming a magnetic speed and direction detection device, the method comprising the steps of:

introducing a first set of runners and a second set of runners wherein the first set of runners is approximately perpendicular to the second set of runners, configuring the first set of runners with the second set of runners as a first Wheatstone bridge, the first Wheatstone bridge configured to generate at least a first output signal in the presence of a variable magnetic field; and introducing a second Wheatstone bridge, the second Wheatstone bridge configured to generate at least a second output signal in the presence of the variable magnetic field; the second Wheatstone bridge located a distance from the first Wheatstone bridge; the distance being selected to create a phase shift between the first output signal and the second output signal;

wherein the first and second Wheatstone bridges are oriented with respect to a ring magnet such that the first set of runners is substantially in parallel to a radial line from the center of the ring magnet and the second set of runners is substantially perpendicular to the radial line from the center of the ring magnet.

13. The method of claim 12, the first Wheatstone bridge and the second Wheatstone bridge being fabricated as an integrated circuit.

14. The method of claim 13, further comprising the step of introducing a computing means in communication with the first Wheatstone bridge and the second Wheatstone bridge.

15. The method of claim 14, the computing means being fabricated on the integrated circuit.

16. The method of claim 14, wherein the ring magnet comprises a magnet array in proximity to the first and second Wheatstone bridges.

17. The method of claim 12 further comprising the step of determining a direction of movement of the ring magnet based on the shift between the first output signal and the second output signal.

18. An apparatus to sense the speed and direction of a ring magnet, the apparatus comprising:

at least a first set of runners and at least a second set of runners adjacent to the moving member, wherein the first set of runners is approximately perpendicular to the second set of runners; the first set of runners and the second set of runners configured as a first Wheatstone bridge, the first Wheatstone bridge configured to generate at least a first output signal as the ring magnet moves and as a magnetic field associated with the ring magnet electrically influences at least one of the first and second set of runners; and the apparatus further comprising a second Wheatstone bridge located a distance from the first Wheatstone bridge, the second Wheatstone bridge configured to generate at least a second output signal as the ring magnet moves and in the presence of the magnetic field associated with the ring magnet; and the distance between the first and second Wheatstone bridge selected to create a phase shift between the first and second output signals;

wherein the first Wheatstone bridge is oriented with respect to the ring magnet such that the first set of runners is substantially in parallel to a radial line from the center of the ring magnet and the second set of runners is substantially perpendicular to the radial line from the center of the ring magnet.

19. The apparatus of claim 18, the first set of runners further comprising a first set of resistive elements, the second set of runners further comprising a second set of resistive elements.

20. The apparatus of claim 18, further comprising a computing means in communication with the first set of runners and the second set of runners.

21. The apparatus of claim 20, wherein the computing means is configured to determine a direction of movement of the ring magnet based on the phase shift between the first output signal and the second output signal.

22. The apparatus of claim 18, the first Wheatstone bridge and the second Wheatstone bridge being fabricated as an integrated circuit.

23. The apparatus of claim 22, further comprising a computing means in communication with the first Wheatstone bridge and the second Wheatstone bridge, the computing means configured to determine the rotational speed and direction of the ring magnet that is rotating based upon the first bridge signal's relationship to the second bridge signal.

24. The apparatus of claim 23, the computing means being fabricated on the integrated circuit.

25. The apparatus of claim 22, the second Wheatstone bridge further comprising a third set of runners and a fourth set of runners, the first set of runners and the second set of runners in the first Wheatstone bridge oriented corresponding to the third set of runners and the fourth set of runners in the second Wheatstone bridge.

26. The apparatus of claim 22, the first Wheatstone bridge being further configured in the same orientation as the second Wheatstone bridge.

27. The apparatus of claim 18, the ring magnet comprising a magnetic array which further comprises at least a first magnetic orientation and at least a second magnetic orientation.

28. The apparatus of claim 18, wherein the first and second Wheatstone bridges are placed approximately in a plane parallel to and facing the side of the ring magnet.

29. The apparatus of claim 18, wherein the first and second Wheatstone bridges are placed approximately in a plane parallel to and at the end of the ring magnet.

30. An apparatus to sense the speed of a ring magnet, the apparatus comprising:

at least a first set of runners and at least a second set of runners adjacent to the ring magnet, wherein the first set of runners is approximately perpendicular to the second set of runners; the first set of runners and the second set of runners configured as a Wheatstone bridge, the Wheatstone bridge configured to generate at least an output signal as the ring magnet moves and as a magnetic field associated with the ring magnet electrically influences at least one of the first and second set of runners;

wherein the Wheatstone bridge is oriented with respect to the ring magnet such that the first set of runners is substantially in parallel to a radial line from the center of the ring magnet and the second set of runners is substantially perpendicular to the radial line from the center of the ring magnet.

31. The apparatus of claim 30, the first set of runners further comprising a first set of resistive elements, the second set of runners further comprising a second set of resistive elements.

32. The apparatus of claim 30, further comprising a computing means in communication with the first set of runners and the second set of runners of the Wheatstone bridge, wherein the computing means is configured to determine the rotational speed of the ring magnet.

33. The apparatus of claim 30, the Wheatstone bridge being fabricated as an integrated circuit.

34. The apparatus of claim 30, the ring magnet comprising a magnetic array which further comprises at least a first magnetic orientation and at least a second magnetic orientation.

* * * * *